United States Patent

Mammosser

[11] Patent Number: 5,309,802
[45] Date of Patent: May 10, 1994

[54] APPARATUS FOR REMOVING TIE WRAPS

[76] Inventor: Mark W. Mammosser, 106 E. Jefferson St., Apt. 134, Shorewood, Ill. 60436

[21] Appl. No.: 888,247

[22] Filed: May 22, 1992

Related U.S. Application Data

[63] Continuation of Ser. No. 685,724, Apr. 15, 1991, abandoned.

[51] Int. Cl.⁵ ............................................. B26D 1/06
[52] U.S. Cl. .................................. 83/13; 83/DIG. 1; 30/278; 30/282
[58] Field of Search ............... 30/282, 278, 289, 2, 30/134; 83/13, DIG. 1; 280/801

[56] References Cited

U.S. PATENT DOCUMENTS

| | | |
|---|---|---|
| 1,061,236 | 5/1913 | Fuller . |
| 2,041,386 | 5/1936 | Van Laanen . |
| 3,911,577 | 10/1975 | Nickel ................................ 30/278 |
| 4,858,317 | 8/1989 | Seib et al. . |
| 4,873,767 | 10/1989 | Lok ..................................... 30/289 |
| 4,944,092 | 4/1990 | De Groot et al. ................. 30/134 |

FOREIGN PATENT DOCUMENTS

| | | |
|---|---|---|
| 3204063 | 2/1982 | Fed. Rep. of Germany ... 83/DIG. 1 |
| 3222551 | 6/1982 | Fed. Rep. of Germany ... 83/DIG. 1 |

*Primary Examiner*—Douglas D. Watts
*Assistant Examiner*—Allan M. Schrock
*Attorney, Agent, or Firm*—Rockey, Rifkin and Ryther

[57] ABSTRACT

A compact apparatus for severing and removing tie wraps after their installation consists of a cap, a base, a button having a cutting blade mounted for reciprocating motion therein and springs for returning the button to its original position after operation. A tie wrap is passed through the device prior to being secured. The tie wrap is severed by manually reciprocating the blade.

16 Claims, 1 Drawing Sheet

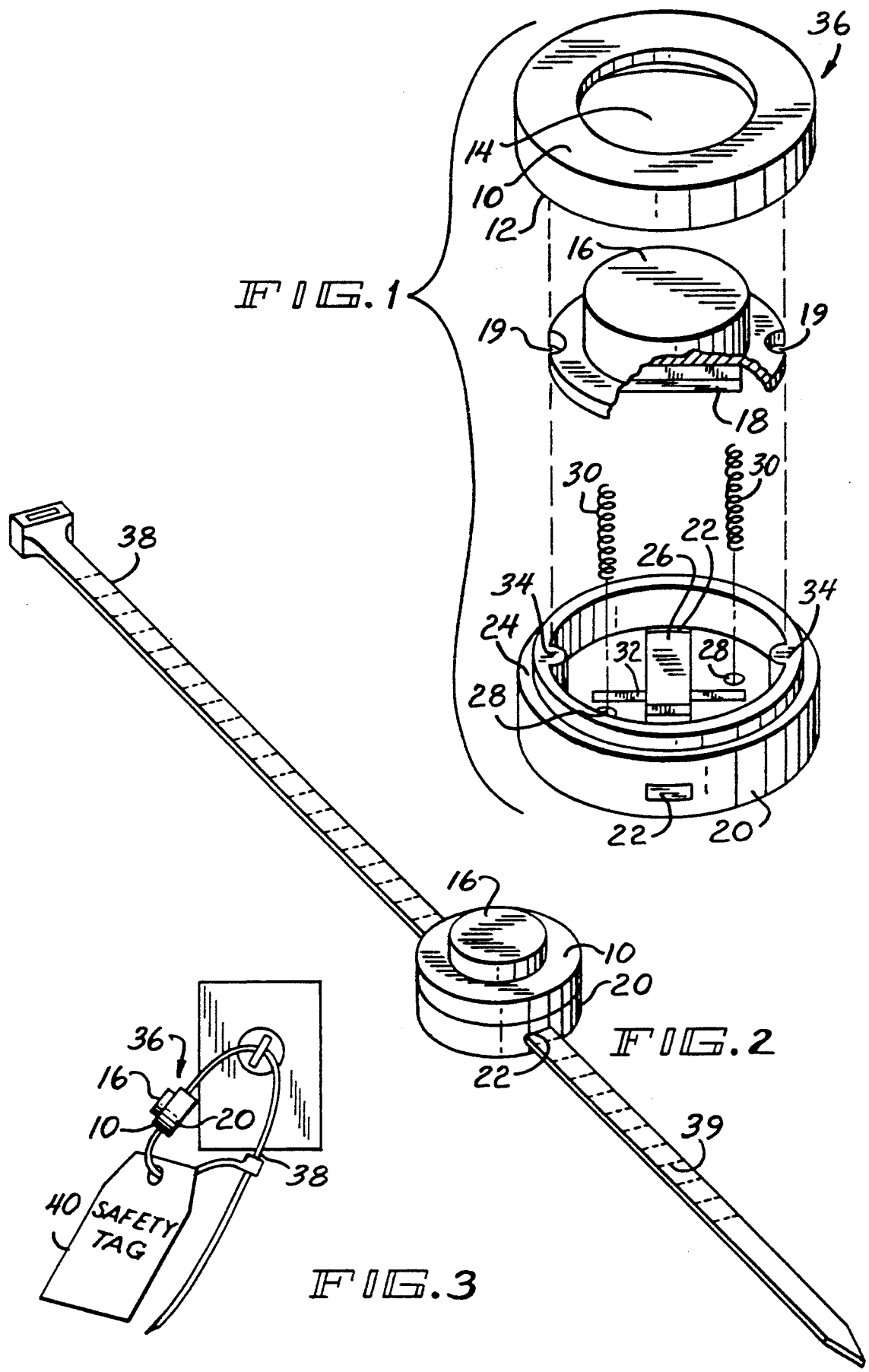

APPARATUS FOR REMOVING TIE WRAPS

This is a continuation of copending application Ser. No. 07/685,724 filed on Apr. 15, 1991, now abandoned.

BACKGROUND AND OBJECTS OF THE INVENTION

The present invention relates to a cutting tool and more particularly to such a tool for removing self-locking tie wraps after installation.

Tie wraps are commonly used for a variety of purposes in industrial settings. Typically, the tie wrap consists of a strap having a securing mechanism integral therewith. The distal end of the tie wrap is passed through an opening in the securing mechanism, which contains a tab that engages teeth disposed along the length of the strap. The tab engages successive teeth as the strap is pulled through the securing mechanism. The tab acts as a ratchet, effectively preventing the strap from being removed after it is installed. Tie wraps may be made from a wide range of material (for example, nylon).

One such purpose for which tie wraps are commonly used is securing tags to equipment that is to be serviced for maintenance purposes. In order to comply with regulations of the Occupational Safety and Health Administration, recent regulations require that these tags be secured by non-reusable means. Obviously, the tags must be removed after maintenance operations have been completed. Typically, maintenance employees use diagonal pliers or similar cutting tools to remove the tags; however, pliers are easily misplaced. Additionally, some alternative tools, such as razor knives, can be dangerous to operate. A device that overcomes these problems is desirable.

Accordingly, it is an object of the present invention to provide a device for removing self-locking tie wraps.

It is another object of the invention to provide such a device that is quickly and easily installed and remains secured to the tie wrap.

It is a further object of the invention to provide such a device that is simple and safe to use.

It is still another object of the invention to provide such a device that is reusable.

It is yet another object of the invention to provide such a device having durable construction and low cost.

These and other objects of the invention will become apparent to those skilled in the art when the following detailed description of the invention is read in conjunction with the accompanying drawings.

SUMMARY OF THE INVENTION

The present invention is a compact apparatus for removing tie wraps after installation. It consists of a cap which is press-fitted onto a base. A cutting blade is mounted for reciprocating motion therein between the cap and the base on a manually operable button. The base has a horizontal opening through which a tie wrap may be passed prior to being secured. The tie wrap is severed by manually pressing the button, reciprocating the blade. A biasing means returns the button to its initial position after use.

BRIEF DESCRIPTION OF THE DRAWINGS

FIG. 1 is an exploded view of the present invention.

FIG. 2 is a perspective view of the present invention positioned on a typical tie wrap.

FIG. 3 is a perspective view showing the present invention positioned on a tie wrap that has been secured for its intended use.

DETAILED DESCRIPTION OF A PREFERRED EMBODIMENT

Referring to the drawings, FIG. 1 and FIG. 2 are useful in explaining the construction and assembly of the present invention. FIG. 2 shows the present invention installed on a typical tie wrap. An annular cap 10 includes a lip portion 12. The cap 10 is formed to include an aperture 14.

A button 16 has a cutting blade 18 rigidly attached thereto. The button is constructed for reciprocating motion between the cap 10 and a base 20, as will be fully described hereinafter. When the device is assembled, the button 16 may be manually accessed through the aperture 14 in the cap 10. The button 16 is formed to include a pair of diametrically opposed grooves 19.

The base 20 is formed to include a pair of diametrically opposed openings 22 through which a tie wrap may be passed, as is hereinafter fully described. A lip portion 24 is formed in the upper rim of the base 20 so that the cap 10 may be securely press fit thereon. The bottom interior of the base 20 is formed to include a groove 26 to allow passage of a tie wrap 38 therethrough. A pair of recesses 28 are formed in the bottom of the base 20. The recesses each receive a spring 30. It should be noted that the bottom surface of the button 16 is formed to include a pair of recesses (not shown) to receive the distal ends of the springs 30. When the device is assembled, the springs 30 bias the button 16 away from the bottom of the base 20. A slot 32 is formed in the bottom of the base 20 and substantially perpendicular to the groove 26. The slot 32 allows passage of the blade 18 when the button 16 is pressed to ensure that the tie wrap 38 is completely severed. Finally, the base 20 includes a diametrically opposed pair of tabs 34, which cooperate with the grooves 19 to align the button 16 and blade 18 with the slot 32.

The lip portion 12 of the cap 10 is constructed to engage the lip portion 24 of the base 20 when the two pieces are pressed together. Prior to pressing the cap 10 into place, the springs 30 are placed in the recesses 28 and are aligned with the corresponding recesses in the button 16. Although coil springs are shown, it is to be understood that any suitable biasing means may be used. Finally, the cap 10 is pressed onto the base 20, taking care to align the grooves 19 with the tabs 34. The cap 10, button 16 and base 20 are preferably formed from extruded plastic, while the blade 18 and the springs 30 are preferably formed from metal, such as steel. The use of the non-metallic cap 10, button 16 and base 20 ensures that blade 18 will not produce sparks as blade 18 severs tie wrap 38 and enters slot 32. Moreover, the use of these non-metallic elements also prevents the production of sparks should the device strike a metallic surface. The prevention of sparks eliminates an ignition source and makes the invention safe to use in hazardous environments that may be encountered in an industrial setting.

After the device 36 is assembled, a tie wrap 38 having a plurality of locking tabs 39 disposed thereon may be inserted into one of the openings 22 and passed through the interior of the base 20 through the groove 26, as shown in FIG. 2. This orientation ensures that the tie wrap 38 will be severed by the blade 18 when the button 16 is manually actuated.

FIG. 3 is useful in explaining the operation of the invention. A tie wrap removing device 36 is installed on a tie wrap 38 before the tie wrap 38 is secured. The tie wrap is then used to secure a tag 40 as previously described. When removal of the tag 40 is desired, the button 16 is manually pressed, causing the blade 18 to sever the tie wrap 38. The severed tie wrap may be removed and discarded while the device 36 may be saved for later use.

As can be seen, the present invention may be simply and inexpensively constructed. It reduces the need to use cumbersome and potentially dangerous tools to remove installed tie wraps.

The present invention has been described with respect to certain embodiments and conditions, which are not meant to limit the invention. Those skilled in the art will understand that variations from the embodiments and conditions described herein may be made without departing from the invention as set forth in the appended claims.

What is claimed is:

1. In combination, a tie wrap and a device for severing the tie wrap comprising:
   a) a tie wrap having a securing means on a first end thereof,
   b) means for completely severing the tie wrap; and
   c) means for mounting the severing means on the tie wrap between the securing means and the distal end when the distal end is engaged with the securing means, said means for mounting completely surrounding the tie wrap.

2. The device for severing tie wraps of claim 1 wherein said severing means comprises a cutting blade that may be manually brought into engagement with said tie wrap.

3. The device for severing tie wraps of claim 1 wherein said severing means comprises:
   a) a cap having portions defining an aperture therein;
   b) a base adapted to receive said cap, and;
   c) a button mounted for reciprocating motion between said cap and said base, said button having a cutting blade rigidly secured thereto, said button being manually accessible through said aperture in said cap.

4. The device for severing tie wraps of claim 1, wherein the means for mounting includes a base defining a passage extending therethrough and dimensioned to receive the tie wrap.

5. The device for severing tie wraps of claim 1, further including means for supporting the tie wrap adjacent the means for severing.

6. In combination, a tie wrap and a device for securing the tie wrap comprising:
   a) a tie wrap having a securing means disposed on a first end thereof, said securing means allowing passage of the distal end of said tie wrap in one direction but preventing the removal thereof, and;
   b) severing means mounted on said tie wrap between said securing means and said distal end, said severing means being manually operable to sever said tie wrap.

7. The device for severing tie wraps of claim 6 wherein said severing means comprises a cutting blade that may be manually brought into engagement with said tie wrap.

8. The device for severing tie wraps of claim 6 wherein said severing means comprises:
   a) a cap having portions defining an aperture therein;
   b) a base adapted to receive said cap, and;
   c) a button mounted for reciprocating motion between said cap and said base, said button having a cutting blade rigidly secured thereto, said button being manually accessible through said aperture in said cap.

9. The device for severing tie wraps of claim 8 wherein said severing means further comprises biasing means for returning said button to an initial position following manual actuation of said button.

10. The combination of a tie wrap and a device for severing tie wraps after installation, comprising:
    a) a tie wrap having a securing means disposed on one end thereof, said securing means allowing passage of the opposite end of said tie wrap in a first direction but preventing passage thereof in a second direction opposite to said one direction;
    b) means for receiving said tie wrap for mounting the device on the tie wrap, said means for receiving being constructed of a non-spark producing material;
    c) means for severing the tie wrap after said opposite end engages said securing means;
    d) means for supporting said means for severing for reciprocating movement relative to said means for receiving such that said means for severing can be brought into contact with said tie wrap to completely sever the tie wrap, said means for supporting being constructed of a non-spark producing material whereby contact between said means for severing and said means for supporting will not produce sparks.

11. The device of claim 10, wherein said means for receiving and said means for supporting surround the means for severing to isolate the means for severing from the external environment.

12. The device of claim 10, wherein said means for receiving consists of a base having openings formed therein through which the tie wrap is passed.

13. The device of claim 10, wherein the means for severing includes a cutting blade.

14. The device of claim 10, wherein the means for supporting includes a button mounted for reciprocating motion in said base, said button being manually operated to bring the severing means into contact with said tie wrap.

15. The device of claim 1, wherein said means for mounting is constructed of a non-metallic material whereby contact between the means for severing and the means for mounting will not produce sparks.

16. A method for severing tie wraps after installation wherein said tie wraps include securing means disposed at one end thereof and a means for engaging the securing means at the opposite end thereof, said securing means allowing passage of the opposite end of the tie wrap in a first direction, but preventing passage of the tie wrap in a second direction opposite to the first direction, comprising the steps of:
    a. mounting a severing means on the tie wrap between said securing means and said opposite end before said opposite end engages said securing means;
    b. engaging said securing means with said opposite end; and
    c. operating said severing means to sever said tie wrap.

* * * * *